United States Patent [19]

Hodes et al.

[11] 4,363,854
[45] Dec. 14, 1982

[54] METHOD FOR MANUFACTURING WORKPIECES HAVING ADAPTATION FACES CAPABLE OF WITHSTANDING EXTREMELY HIGH SURFACE PRESSURES AND TEMPERATURES, AND PRODUCT PRODUCED THEREBY

[75] Inventors: Erich Hodes, Rosbach; Michael Steeg, Mainz; Peter Lippok, Wiesbaden-Biebrich, all of Fed. Rep. of Germany

[73] Assignee: Glyco-Metall-Werke Daelen & Loos GmbH, Wiesbaden, Fed. Rep. of Germany

[21] Appl. No.: 160,069

[22] Filed: Jun. 16, 1980

[30] Foreign Application Priority Data

Jul. 3, 1979 [DE] Fed. Rep. of Germany ....... 2926708

[51] Int. Cl.³ .................................................. B32B 3/00
[52] U.S. Cl. ...................................... 428/632; 204/96;
308/241; 428/472; 428/643; 428/648; 428/652;
428/680; 428/687; 428/155
[58] Field of Search ............... 428/629, 687, 632, 633,
428/643, 644, 650–654, 645, 646, 680, 934, 935,
472, 155; 308/241, DIG. 8, DIG. 9, 6 R;
204/96

[56] References Cited

U.S. PATENT DOCUMENTS

| 3,133,341 | 5/1964 | Marien | 428/472 |
| 3,133,739 | 5/1964 | Marien | 428/472 |
| 3,418,028 | 12/1968 | Watson et al. | 308/241 |
| 3,514,319 | 5/1970 | Hata et al. | 428/472 |
| 3,865,608 | 2/1975 | Borberly et al. | 428/472 |
| 3,948,651 | 4/1976 | Lundin | 75/139 |
| 3,950,141 | 4/1976 | Roemer | 428/653 |
| 3,990,862 | 11/1976 | Dahl et al. | 428/613 |
| 4,212,907 | 7/1980 | Wright | 428/629 |

FOREIGN PATENT DOCUMENTS 2840425 3/1980 Fed. Rep. of Germany.

Primary Examiner—Michael L. Lewis
Attorney, Agent, or Firm—H. Gibner Lehmann; K. Gibner Lehmann

[57] ABSTRACT

Manufacturing method and high-stress resistant product produced thereby. The method involves electro deposition by cathodic electrolysis of a thin metallic layer of the oxide of the metal molybdenum, on the surface of a metal workpiece. The workpiece, which could be solid or else a laminate such as a slide bearing, thus has an adaptation surface capable of withstanding extremely high surface pressures and/or high temperatures, and of preventing metallic-surface abrasion or galling, and dry friction.

6 Claims, 6 Drawing Figures

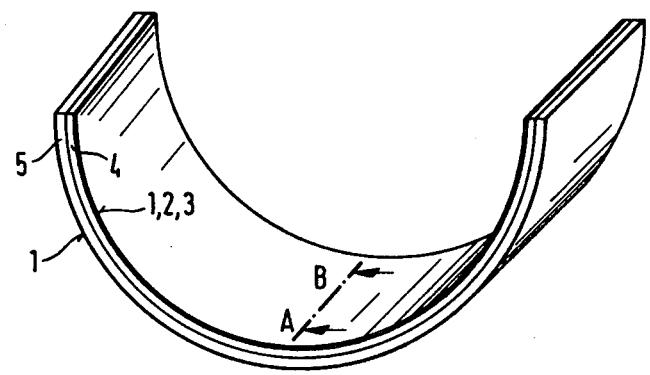
Fig. 1
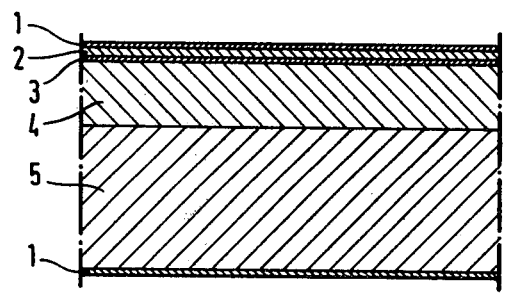
Fig. 2 (A-B)

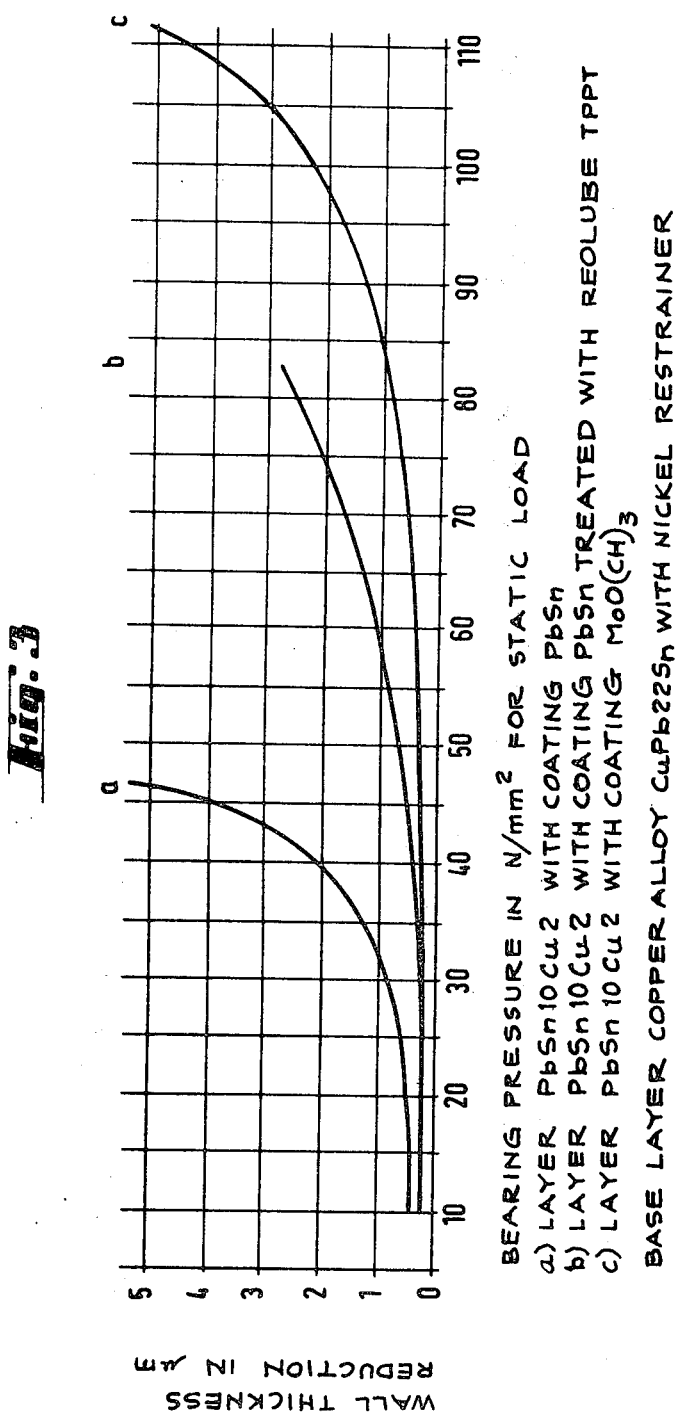

METHOD FOR MANUFACTURING WORKPIECES HAVING ADAPTATION FACES CAPABLE OF WITHSTANDING EXTREMELY HIGH SURFACE PRESSURES AND TEMPERATURES, AND PRODUCT PRODUCED THEREBY

BACKGROUND

This invention relates to a method for manufacturing workpieces having adaptation layers or surfaces which are capable of withstanding extremely high surface pressures and/or high temperatures. Further, the invention relates to the workpieces which have such adaptation layers.

The basic concept of the invention is embodied in the described examples of slide bearing structures.

With each starting or stopping of a hydrodynamically-oiled bearing part, normally the film of the anti-friction substance is traversed or broken through. In consequence there results a partial, direct contact between the slide-bearing material and the shaft or arbor. Normally, with sliding bearings, an initial adaptation procedure is necessary so as to cause, in new or virginal bearing pairs, an accommodation or break-in between the microgeometry of the arbor and the bearing; that is, the coarseness points or geometric inaccuracies resulting from the processing of the threshold surfaces are smoothed out through programmed abrasion whereby the ability of the carrying surfaces of the bearing part to withstand the maximum mechanical load is improved. The time that was necessary for this method of bearing break-in has, up to now, been dependent on the characteristics of the Tribo-systems, i.e. the slide bearing material, the arbor or shaft material, and the lubricant material. By the use of galvanic electroplating for high-load, ready-to-install bearing members of combustion engines, the so-called three-substance bearings eliminate preventive adaptation procedures. At Motore der PKW-Industrie, break-in is practically obsolete, while with diesel motors in the range of from 370 to 1580 kw the break-in time can be lowered to between 2 and 5 hours, from between 20 and 30 hours. With three-substance bearings, as a rule, comprising a base layer of basic slide bearing substance consisting of, for example, copper or aluminum alloying work material, a ductile galvanized electroplate in a layer thickness of from 0.015 mm to 0.040 mm (usually measured galvanically, that is, without additional mechanical working) can be built up.

The adaptability of the relatively soft, ductile galvanic layer facilitates the break-in process and improves as well the frictional resistance of the slide bearing to welding with the arbor and also improves the moistening or wetting effect in connection with lubricants. The galvanic electroplating is constituted of either lead-indium, lead-tin, or else lead-tin-copper. In connection with the latter it is known that alloys have been recently used having a raised copper content, up to 10% by weight (German publication DE-OS No. 27-22-144).

The increased demands on the part of motor manufacturers for increased load capability as well as improved fatigue strength, abrasion and corrosion resistance have led to this newer galvanic layering. However, due to the greater hardness of the alloyd surfaces, the requirements for efficiency in the break-in process are no longer totally satisfactorily fulfilled. Efforts have been made to come closer to a solution through the addition of EP-mixtures to the lubricating oil, whereby there is effected the wearout of the high spots or points of coarseness through a devious chemical-mechanical process. Because of partial contact of the slide surfaces during the adaptation or break-in procedure, pressure points and temperature flashes originate to a certain degree. A chemical reaction of the developing active or agressive element or hormone added to the work material of the bearing piece under buildup of, for example, metal sulfides, chlorides and/or phosphates, which is strengthened in the zone of the alloy friction, results in a chemical break-in side-by-side with the mechanical break-in.

It has been shown that after a lapse of some time, stress (especially in the zone of the alloy friction) leads to a build-up of adhesion bridges in the bearing, through the formation of non-metallic isolation layers which separate the bearing material from the arbor material. These adhesion bridges thereby prevent material fatigue which could be caused by welding and high shear forces. It has been observed that the reaction transformation of the surface of the slide bearing material, in particular the existing galvanic layers of lead, tin and copper, is very unequally divided over the bearing surface area during the break-in phase, depending on the type and size of the coarseness and the operational requirements of the motor (long run, or short run and corresponding temperatures). This unequal division, and also those periodic run-downs which are uncontrollably run, can give rise naturally to operation interruptions.

One object of the invention is to provide an improved slide bearing or anti-friction member and adaptation layer or surface thereon, in particular a multi-layer or laminated slide member having such an adaptation surface, and also an improved process for producing such members (German Publication No. DE-OS 28-40-425).

In accordance with the invention the problem is solved by providing, on a base member, a metallic-salt adaptation layer in the form of a complete, continuous reactive surfacing or plating by means of a controlled, preventive chemical transformation of the workpiece surface area, said adaptation layer having a capability of preventing corrosion, dry friction, abrasion and welding between two metal surfaces, and of withstanding high pressures.

A corrosion and high-pressure resistant admixture is already produced, which when first put in operation under reaction of elevated pressures and temperatures is known to be partially effective in becoming an additive and/or inhibitive in the natural as well as the synthetic lubricants and/or emulsions intended to reduce friction, abrasion temperature and/or corrosion.

A further object of the invention is to produce a novel workpiece, and in particular a slide bearing element, which has an adaptation layer that exhibits decidedly improved characteristics.

This is accomplished by the provision of a workpiece which carries on its exposed surface area a complete and continuous reaction layer of high shaft stability in the form of metallic chlorides, phosphates and/or sulfides, which prevent dry friction and welding of metal surfaces.

The workpieces can preferably be a slide bearing element whereby its slide layer is built-up with a white-metal alloying, elevated-copper ingredient, or with hard nickel-tin alloying or else with a mixture-type suspension alloy, for example, one having aluminum and lead. With such workpieces there is provided by the invention on the slide surface area a uniform, closed, protective isolation layer for reduction of the abrasion and the temperature as well as to increase the fatigue stability and also the resistance to corrosion. Therefore such workpieces can endure, suitably, substantially higher stresses and loads, particularly in the areas of mixed friction, all without complications.

The time required to manufacture existing bearings having special layers is considerable, and the process does not lend itself to automatic production.

Still another object of the invention, therefore, is the provision of a novel adaptation layer, as for example on a slide bearing member and in particular on traditional, multi-layer bearing elements, having the same desirable characteristics as those of the publication identified below, preferably by a low-cost electrochemical process requiring a unit of time of at least from 1 to 2 minutes, depending on the current and bath concentration, so that the separation process in the cycle of existing automatic galvanic equipment can be utilized (German Publication DE-OS No. 28-40-425).

This is solved, according to the invention, by the utilization of a controlled electro-chemical process which produces on the base member the said adaptation layer in the form of a uniform, microfissured, mosaic-like coating or plating comprising the oxide of the metal molybdenum, having a capability of preventing dry friction and welding between metal surfaces.

It has been surprisingly shown that workpieces, in particular traditional slide bearing elements coated, in accordance with the invention, with this oxide of molybdenum show especially better attributes and properties as compared with those known up to now in slide bearing technology.

By means of the invention there is produced, for instance, a slide bearing element of the so-called three-substance type where the hitherto usual and maximum technical properties are greatly enhanced by an improved adaptation layer which is far superior particularly with regard to reduction in wear and running temperature, with increased fatigue stability as well as corrosion resistance (German Publication DE-OS No. 28-40-425).

Systematic production line examinations of slide bearings has shown, among other things, that a surprisingly positive influence is had on duration loadability when usual so-called three-substance bearings are provided by the invention with the electro-chemical plating or adaptation layer of molybdenum oxide.

Even though the first example, below and as illustrated, was chosen in connection with well-known multi-layered slide bearing elements, it is self-evident that other types of slide bearing elements having wear, abrasion, temperature and corrosion-restraining means, as well as still other metallic elements of higher friction and loading, can be provided with the unusually simple, low-cost treatment method for adding an adaptability coating according to the invention.

For instance, trunnions, journals, pistons, cylinder linings, conductors, roller bodies, tool surfaces, tooth flanks of gears, value guides, piston rings, drums and chain teeth can be treated to achieve considerable improvement in wear and other factors.

A so-called three-substance bearing of usual layer structure but embodying the present invention could have the following makeup: On a steel substance, there is poured a copper-lead alloy (Cu Pd 22 Sn) to a thickness of 0.3 um. As a base layer, there is galvanically plated on the copper-lead alloy, a 1.5 um thick restrainer or diffusion coating of nickel, over which there is an insulating, slide and adaptation layer of ternary alloy about 22 um thick, which can be Pb Sn 10 Cu 2. Plated on the ternary alloy there is a 1 um thick adaptation layer, constituted of the oxide of molybdenum. This latter is produced, for example, within from 1 to 2 minutes depending on the current flow and the concentration of the electrolyte, and can be done completely within the full single cycle time of the automatic fabricating equipment. The slide bearing has produced on its surface a uniform, micro-fissured mosaic-like deep black adaptation layer.

Bearing elements made in accordance with the invention have been submitted to slide-layer bench tests. The tests were on a two-part bearing entrance and so arranged that the lower slide-bearing half could be examined at any time. The upper slide-bearing half of the bearing assembly was of the usual construction without the addition of the adaptation layer according to the invention. For adjustment of the test conditions or data (shaft revolutions, lubricating temperature, specific slide-layer loadability and such) only the upper bearing half is statically loaded. The bearing half to be examined is additionally safe-guarded by a larger bearing play, because during start-up, the piston does not come in mechanical contact with the test shell. After adjustment of the test conditions, the lower slide-bearing half to be tested is statically loaded by means of a stepless, adjustable hydraulic cylinder through change of the load direction over a level arm on the bearing assembly. The level arm is mounted on points, and by doing so operates simultaneously as a friction-measuring scale. The friction number is determined by means of a pressure gauge.

| Test data: | |
|---|---|
| Lubricants | SAE 30 (HD) |
| Lubricant inlet pressure | 5 bar |
| Lubricant inlet temperature | 120° C. |
| Bearing entrance | $\phi$ 58,6 mm |
| Piston material | Ck 45 HRC 55 |
| Piston coarseness | Ra 0,14–0, 18 $\mu$m |
| Piston diameter | 54,93 mm |
| Slide-bearing width | 22 mm |
| Speed of rotation | 7000 min$^{-1}$ = 5,75 m/s |

A performance example of the invention is shown with the aid of the accompanying drawings, wherein:

BRIEF DESCRIPTION OF THE DRAWING

FIG. 1 is a perspective view of a slide-bearing half made in accordance with the invention.

FIG. 2 is a fragmentary cross section taken on the line A—B of FIG. 1, showing a preferred form of the invention, enlarged for the sake of clarity.

FIG. 3 is a schematic representation showing bearing-half wall thickness reduction for untreated bearing halves (a), improved bearing halves (b) and invention-treated bearing halves (c) as slope functions, with static-type loading or stress.

Figure 4:
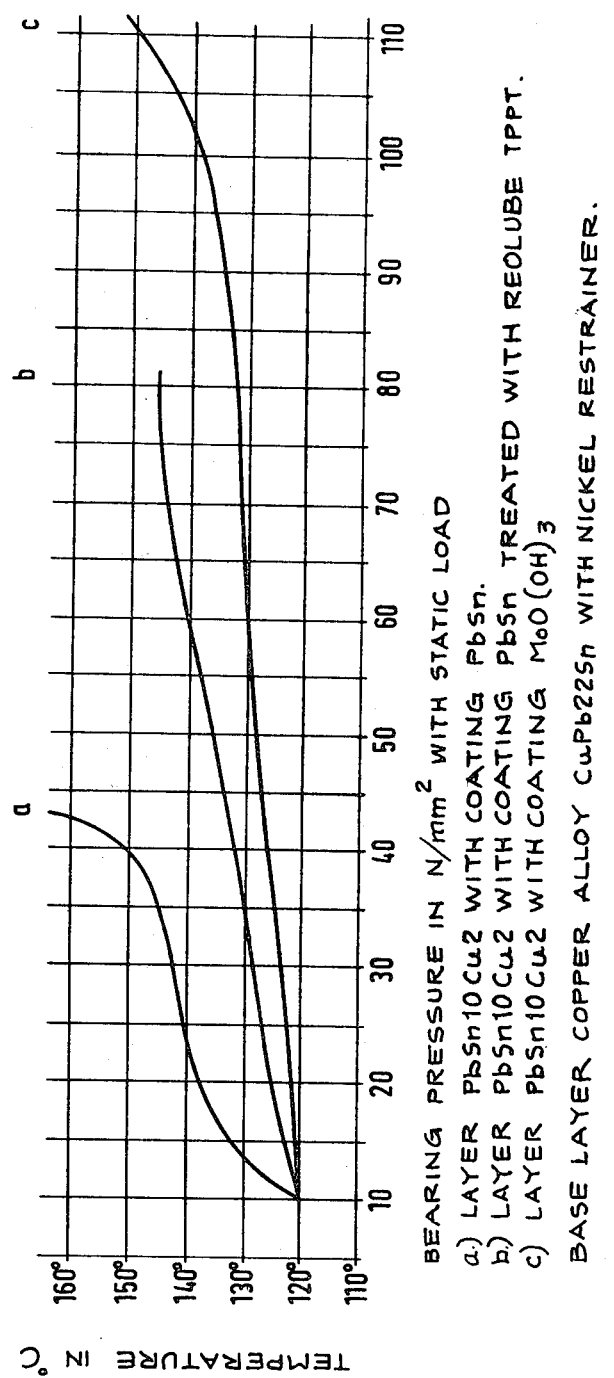
FIG. 4 is a diagrammatic illustration of the temperature graphs for untreated (a), improved (b) and invention-treated (c) slide bearings in dependence on static-type loading always measured at the bearing back after 15 minutes of operation.

In the example of FIGS. 1 and 2 there is shown a steel substrate 5 on which there is a base layer 4 of a copper-lead-tin alloy (Cu Pb 22 Sn) having a thickness of somewhat between 0.2 mm and 0.7 mm. On the base layer 4 there is an extremely thin layer 3 (thickness from 0.001 mm to 0.002 mm) of nickel, which in the usual three-substance bearing acts like a restrainer or diffusion means. Over the diffusion-restrainer layer 3 is, for example, an approximately 0.022 mm thick ternary sliding and adaptation layer 2 of Pb Sn 10 Cu 2. On the sliding layer 2 and also on the steel substrate 5 is next a 0.0005 mm to 0.003 mm thick (preferably 0.001 mm thick) adaptation layer 1 of the oxide of molybdenum.

FIGS. 3 and 4 give again the comparison of graphs for wall thickness change as well as temperature and friction checks of the untreated (a) and treated (b) and (c) slide bearing shells with changeable bearing pressure under at-rest (static) loading. The diagrams show clearly the superiority of the invention-treated (c) slide layer in relation to maximum loadability under the abovementioned test conditions. The untreated (a) slide layers fail at a pressure of 42 N/mm$^2$, in contrast to the treated (b) slide layers, which only failed at a bearing pressure of about 80 N/mm$^2$. The invention-treated slide layers (c) only failed at a bearing pressure of about 100 N/mm$^2$.

Later tests with a practice-approach built-in restraint under aggravated conditions, for example, changing loads, varying speeds and lubricant temperatures, lubricant quantities and/or lubricant pressures and so on showed irreproachably the advantage of the invention-treated, so-called three-substance bearing against the prior known accomplishment. Continued tests in high-revolution racing motors with turbo-charging and fuel injection followed, in contrast to untreated three-substance bearings, without any difficulties. The additional improvement noted showed unmistakeably the advantage of the micro-fissured adaptation layer of the invention, with regard to surface area condition and quality, limits of measurement and friction as well as loadability, in contrast to a usual type of bearing layer structure. Not only slide bearings such as solids and/or laminates, but also other metallic elements which experience high friction and/or abrasion, lend themselves similarly to the simple, low-cost treatment of surface area layers as provided by the invention, so that there is effected abrasion-retarded and/or low-friction layers having lubricant characteristics and high-pressure stability.

Instead of the above structure of slide bearing elements described in connection with FIGS. 1 and 2, other slide-layer structures can have provided on them the adaptation layer of the present invention. For example, the slide layer of a slide bearing element can consist of a suspension alloy which tends to dissociate, being formed thermokinetically or also built up as a coating which together with the carrier layer is mechanically thickened. These suspension alloys can preferably be constituted of aluminum and lead. On the surface area of such slide layers the adaptation layer of the present invention can be readily provided.

Another possibility for use of the adaptation layer as provided by the invention is with slide bearing elements whose slide layers consist of white metal alloys, such as the ternary alloy composed of from 10% to 20% tin, from 6% to 10% copper, with the remainder of lead. In particular there is the ternary alloy consisting of roughly 16% tin, 8% copper and the rest lead, wherein the tin is always from 6% to 8% greater in quantity than the copper. With such a slide layer the adaptation layer provided by the present invention can be readily applied and used.

Still another possibility for the use of the adaptation layer of the present invention is with bearing elements made with hard, thin layers, for instance, elements having thin layers of hard tin-containing alloys, on which layers of softer metallic material are located. In such case the layer of nickel-tin alloy can have a tin content of between about 30% and 90% by weight and a maximum thickness of about 0.01 mm, preferably somewhere between 0.005 and 0.01 mm. The slide layer carried by the nickel-tin alloy layer can have a maximum thickness of 0.05 mm and preferably a thickness between 0.005–0.015 mm with a Brinell hardness of between 4 and 30 kp/mm$^2$. After for these bearings the improved adaptation layer can be applied and utilized to good advantage.

Figure 5:
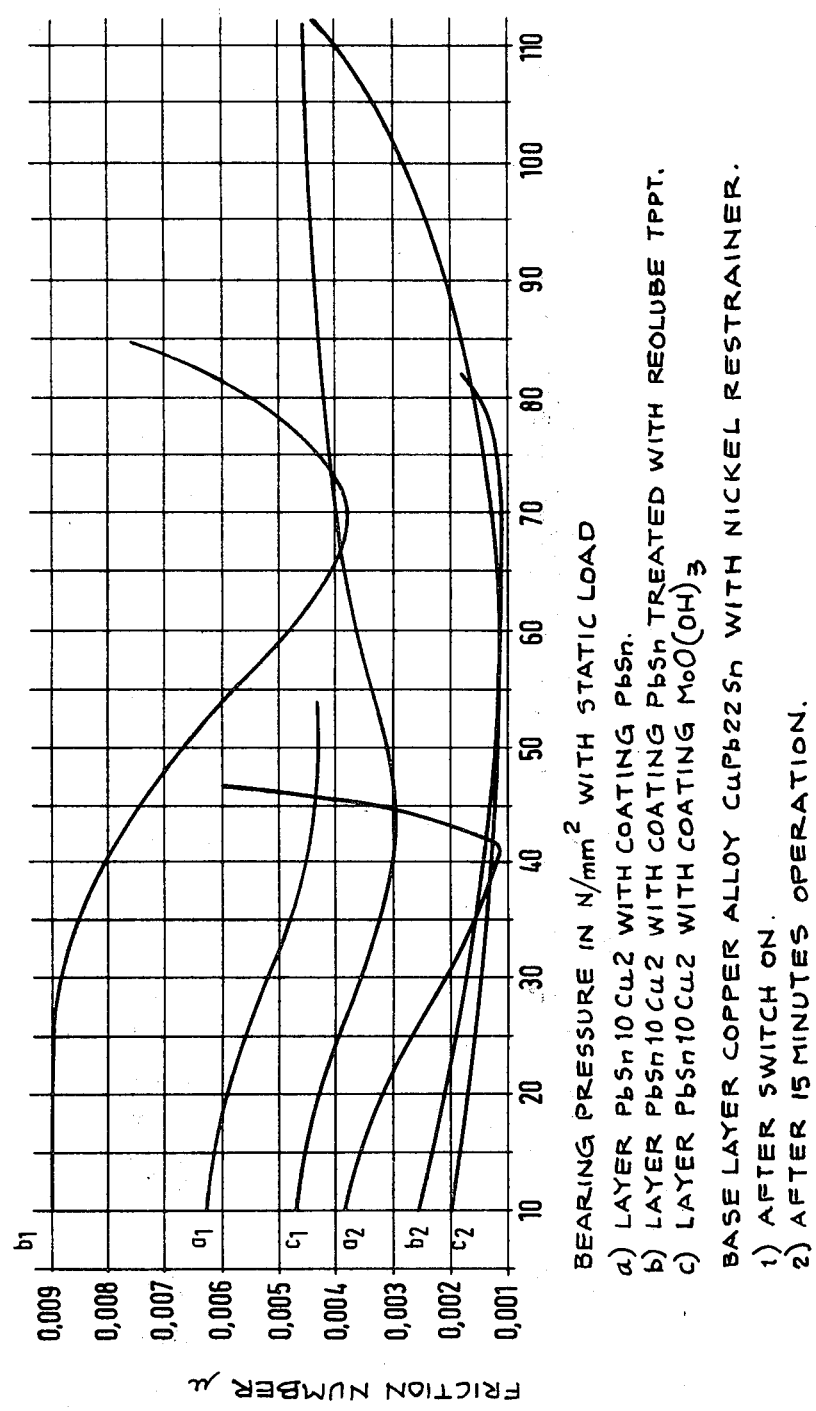
FIG. 5 is a comparison confrontation of the friction number graph for the bearings (a), (b) and (c) in dependence on static stress or loadability, measured first in virginal condition immediately after removal of the load, and second after the elapse of 15 minutes time.

As FIGS. 3, 4 and 5 show, the adaptation layer provided by the invention has much better run-in and abrasion-resistant properties as compared with usual ternary layer bearings. In addition, the application time, considering a 1 μm thickness of from 1 to 2 minutes depending on the current strength and concentration of the electrolyte, falls completely within the unit time in automation. Besides having the object of improving the microgeometry and its friction partner in the bearing run-in phase, the oxidized layer provided by the invention does more, and is of advantage in connection with mixed friction areas, to reduce considerably the abrasion.

Over and above that, it has been shown that the oxide layers universally exercise an important corrosion protection function. Also, neither are finger prints noticeable on oxide-protected bearings, which is the usual case with ternary slide layers. Nor do black spots appear on the bearing shells, as from basic lead sulfide, due to long storage in warehouses. The adaptation layer as provided by the invention is thus seen to be polyfunctional.

With the help of X-ray deflection, the following layers of oxides of molybdenum are produced electrochemically, depending on the experimental conditions employed.

| (1) | $Mo_5O_8(OH)_8$ | (4) | $Mo_9O_{26}$ |
| (2) | $MoO(OH)_3$ | (5) | $Mo_{17}O_{47}$ |
| (3) | $Mo_4O_{11}$ | (6) | $Mo_9O_{26}$ |

The best and most uniform oxide layers and those bonded to the base metal, are obtained when using the following listed electrolytic data, under the stated conditions:

| $(NH_4)_6Mo_7O_{24} \cdot 4H_2O$ | = 10 to 20 g/l |
| $NH_4NO_3$ | = 15 to 30 g/l |
| i | = 1.5 to 2.0 A/dm$^2$ |
| T | = 35 to 40° C. |
| t | = 1.5 to 2.0 min |

-continued

| Anode | = Remanit |
|---|---|
| pH | = 5 to 6 |
| Reaction | = cathodic |

The adaptation layer of the present invention consists essentially of molybdenumoxidehydroxide (MoO&OH)$_3$ when produced by cathodic electrolysis in an aqueous bath of:

10 g/l Ammoniumheptamolybdate, $(NH_4)_6Mo_7O_{24}\cdot 4H_2O$ and 15 g/l Ammoniumnitrate, $NH_4NO_3$ by T=40° C.

with a current of 2 A/dm$^2$ for a period of 2 minutes. It is mosaic-like, micro-fissured, and built-up in nature whereby it tends to reduce surface tension and is mainly X-ray amorphous. The size of the individual mosaic "building blocks" is influenced by:

The current i
The temperature T
The concentration of $(NH_4)_6MO_7O_{24}\cdot 4H_2O$
The deposition time t In addition to the above examples, the adaptation layers and their manufacture as provided by the invention are conceivably applicable to practically all known layers of slide and bearing elements.

Figure 6:
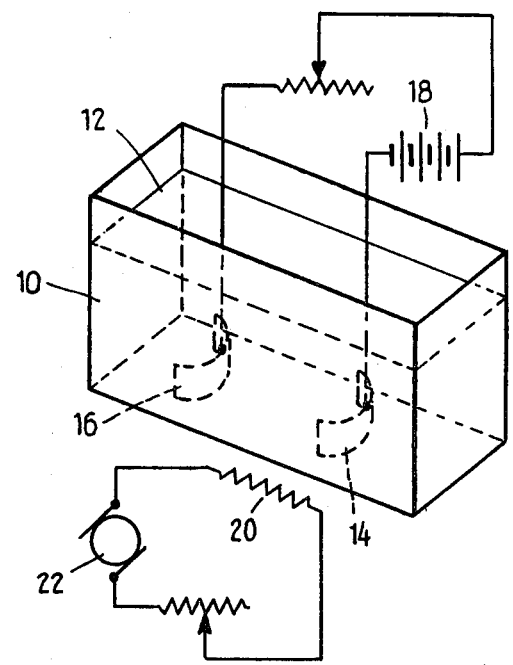
FIG. 6 is a diagrammatic representation of a plating apparatus in simplified form, by which the invention can be practiced.

FIG. 6 shows a simplified plating apparatus for carrying out the invention. A plating tank 10 has an electrolytic bath 12 wherein the bearing half 14 to be treated is located, as the anode. A cathode 16 is in the bath, and a power source 18 provides electrical energy. The tank 10 can be heated by an electric coil 20 connected to a power source 22.

Applicants hereby claim priority under 35 USC 119 of German Application No. P 29 26 708.1 filed July 3, 1979.

We claim:

1. As a finished article of manufacture, a slide bearing comprising a laminate having a base member on the working surface of which there is a slide layer of a friction alloy and, electroplated on the working surface of said slide layer, an electro-deposited adaptation layer which is capable of withstanding extremely high surface pressures and high temperatures and which is capable of preventing dry friction and abrasion between metal surfaces, said adaptation layer comprising an oxide of the metal molybdenum and said adaptation layer having discontinuous surface areas which form a uniformly micro-fissured mosaic-like pattern, said adaptation layer produced according to the following listed electrolytic data, under the stated conditions:

| $(NH_4)_6Mo_7O_{24}\cdot 4H_2O$ | = 10 to 20 g/l |
|---|---|
| $NH_4NO_3$ | = 15 to 30 g/l |
| i | = 1.5 to 2.0 A/dm$^2$ |
| T | = 35 to 40° C. |
| t | = 1.5 to 2.0 min |
| pH | = 5 to 6 |
| Reaction | = cathodic. |

2. A new article of manufacture as defined in claim 18, wherein the base member comprises a diffusion layer formed of a nickel-tin alloy with a tin content of between 30% and 90% by weight and a maximum thickness of about 0.1 mm, and comprises a slide layer of bearing material applied over the diffusion layer to a thickness of from 0.005 mm to 0.015 mm with a Brinell hardness of between 4 kp/mm$^2$ and 30 kp/mm$^2$, said adaptation layer being carried by the slide layer.

3. A new article of manufacture as defined in claim 2, wherein the slide layer is an alloy having from 10% to 20% tin, from 6% to 10% copper with the rest comprising lead.

4. A new article of manufacture as defined in claim 2, wherein the slide layer is a suspension alloy of aluminum and lead.

5. A new article of manufacture as defined in claim 2, wherein the slide layer is an alloy having 16% tin and 8% copper with the remainder lead.

6. A new article of manufacture as defined in claim 1, wherein the said electroplated adaptation layer is micro-fissured in a mosaic-like pattern by depositing it by cathodic electrolysis carried out in an aqueous bath of ammoniumheptamolybdate and ammoniumnitrate.

* * * * *